(12) United States Patent
Ren et al.

(10) Patent No.: US 11,328,113 B1
(45) Date of Patent: May 10, 2022

(54) DYNAMIC LOCALIZATION USING COLOR

(71) Applicant: MICRO FOCUS LLC, Santa Clara, CA (US)

(72) Inventors: Yi-Qun Ren, Shanghai (CN); Kai Hu, Shanghai (CN); Le Peng, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/190,966

(22) Filed: Mar. 3, 2021

(51) Int. Cl.
 *G06F 3/0484* (2013.01)
 *G06F 40/109* (2020.01)
 *G06F 3/0482* (2013.01)

(52) U.S. Cl.
 CPC .......... *G06F 40/109* (2020.01); *G06F 3/0482* (2013.01); *G06F 3/0484* (2013.01)

(58) Field of Classification Search
 None
 See application file for complete search history.

(56) References Cited

U.S. PATENT DOCUMENTS

| | | | | |
|---|---|---|---|---|
| 5,145,376 A * | 9/1992 | Krass | ............ | G09B 3/04 434/157 |
| 5,697,793 A * | 12/1997 | Huffman | ............ | G06F 15/0283 434/156 |
| 5,951,298 A * | 9/1999 | Werzberger | ............ | G09B 19/00 434/178 |
| 6,964,014 B1 * | 11/2005 | Parish | ............ | G06F 16/958 715/205 |
| 7,752,501 B2 * | 7/2010 | Bak | ............ | G06F 11/3688 714/38.14 |
| 9,881,002 B1 * | 1/2018 | Qureshi | ............ | G06F 40/40 |
| 9,983,870 B2 | 5/2018 | Hsu et al. | | |
| 10,191,832 B2 | 1/2019 | Zhang et al. | | |
| 10,795,799 B2 | 10/2020 | Lipka et al. | | |
| 2003/0115552 A1 * | 6/2003 | Jahnke | ............ | G06F 40/40 715/201 |
| 2008/0240567 A1 * | 10/2008 | Chaoweeraprasit | .. | G06F 40/109 382/182 |

(Continued)

FOREIGN PATENT DOCUMENTS

| CN | 101201821 A | * | 6/2008 |
| IN | 201941009524 A | * | 9/2020 |
| KR | 20130069059 A | * | 6/2013 |

OTHER PUBLICATIONS

Jose Cezar Ynion; Using AI in Automated UI Localization Testing of a Mobile App; Metropolia University of Applied Sciences; Master's Thesis; Apr. 7, 2020; 59 pages.

*Primary Examiner* — Mandrita Brahmachari

(57) ABSTRACT

A text string is identified that has an associated localized text string; For example, an English text string may have an associated Chinese localized text string. A unique color is associated with the text string. The text string is modified with the associated unique color. The text string with the associated unique color is displayed. A graphical image of the text string with the associated unique color is captured. The text string is localized based the associated unique color in the captured graphical image using the associated localized text string. In a second embodiment, modifying the text string with the unique color is based on an invisible character that is inserted into the text string.

20 Claims, 7 Drawing Sheets

(56) References Cited

U.S. PATENT DOCUMENTS

| | | | |
|---|---|---|---|
| 2013/0006603 A1* | 1/2013 | Zavatone | G06F 40/58 704/2 |
| 2014/0123039 A1* | 5/2014 | Ozer | G06F 9/454 715/762 |
| 2015/0154159 A1* | 6/2015 | Yin | G06F 40/58 715/234 |
| 2015/0324336 A1 | 11/2015 | Glezos et al. | |
| 2018/0024848 A1 | 1/2018 | Dmytryshyn | |
| 2018/0232364 A1* | 8/2018 | Chang | G06F 3/0481 |
| 2019/0324999 A1 | 10/2019 | Travieso et al. | |

* cited by examiner

DYNAMIC LOCALIZATION USING COLOR

FIELD

The disclosure relates generally to localization of a video and particularly to location of a video using colors.

BACKGROUND

One of the current problems is that a software application typically needs to be translated into a number of different languages (localizations). A need exists to create a video of the application using each of the different languages that will be supported. The video in each language is then sent to native speakers for verification. In order to do this, a build with all the localized files needs to be created. A user will then exercise the application in a specific language and then create a recording. This process takes a long time and has to occur at the end of the development cycle. What is needed is a way to perform the localization earlier on in the development process to better identify localization problems.

SUMMARY

These and other needs are addressed by the various embodiments and configurations of the present disclosure. A text string is identified that has an associated localized text string. For example, an English text string may have an associated Chinese localized text string. A unique color is associated with the text string. The text string is modified with the associated unique color. The text string with the associated unique color is displayed. A graphical image of the text string with the associated unique color is captured. The text string is localized based the associated unique color in the captured graphical image using the associated localized text string. In a second embodiment, modifying the text string with the unique color is based on an invisible character that is inserted into the text string.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term "graphical image" may include one or more raptured video images (e.g., screen shots) and/or images that are part of a video stream (e.g., a video recording). For example, a graphical image may include a video recording of a user using a user interface over a period of time. The graphical image may be captured using a video camera/recorder.

As described herein and in the claims when discussing modifying a text string with the unique color may comprise: modifying all the text string with the unique color, modifying only a portion of the text string with the unique color (e.g., an individual character), modifying the text string with a plurality of colors, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
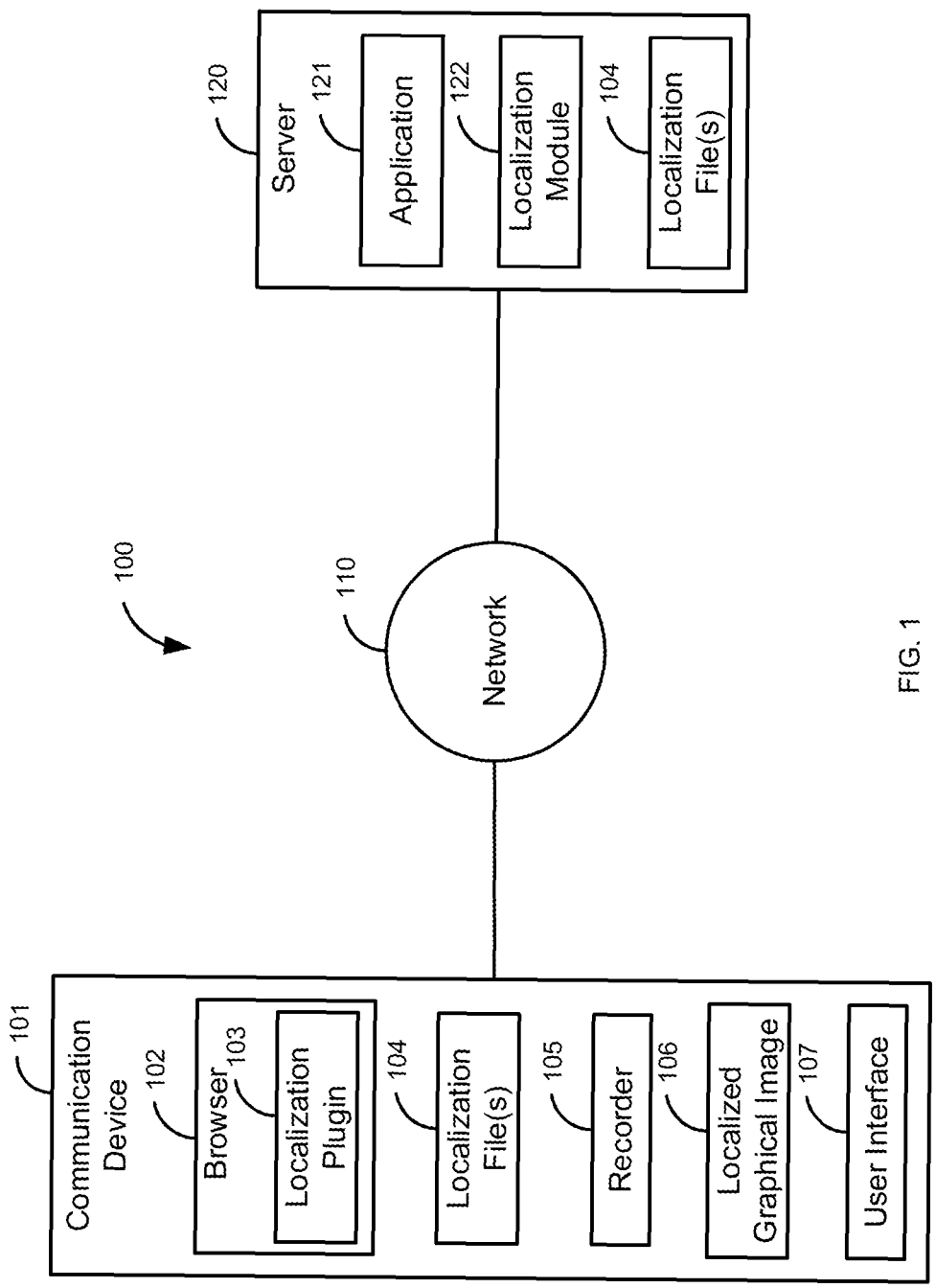
FIG. 1 is a block diagram of a first illustrative system for localizing a graphical image using colors.

FIG. 1 is a block diagram of a first illustrative system 100 for localizing a graphical image using colors. The first illustrative system 100 comprises a communication device 101, a network 110, and a server 120.

The communication device 101 can be or may include any device that can communicate with the server 120 on the network 110, such as a Personal Computer (PC), a telephone, a video system, a cellular telephone, a Personal Digital Assistant (PDA), a tablet device, a notebook device, a smart phone, and/or the like. FIG. 1 only shows a single communication device 101. However, multiple communication devices 101 may be connected to the network 110. In addition, the communication device 101 may directly connect to the server 120.

The communication device 101 further comprises a browser 102, localization files 104, a recorder 105, a localized graphical image 106, and a user interface 107. The browser 102 can be any browser 102, such as, Chrome™, Internet Explorer™, Safari, Opera, Firefox™, Tor™, and/or the like. The browser 102 further comprises a localization plugin 103. The localization plugin 103 may be a browser extension. The localization plugin 103 works with the localization module 122 in the server 120 to generate the localized graphical image 106.

The localization file(s) 104 can be any form of localization file(s) 104 that are used to provide translations in different languages for text strings. The localization file(s) 104 may comprise one or more files. The localization file(s) 104 may support a variety of languages/dialects, such as, English, French, Spanish, German, Chinese, Korean, Japanese, and/or the like. The localization files 104 may have different translations for the same text string depending upon a context. For example, the English word "Ok" may have different Chinese translations based on a context of how the Chinese version of the word "Ok" is being used. The localization file(s) 104 typically comprise a primary language (e.g., English) and the corresponding text translations (localizations) in other languages. The translation may be done by a person or may be accomplished using a machine translation algorithm.

The recorder 105 may be any type of software/hardware that can capture an image/video (a graphical image), such as a camera, a video recorder, and/or the like. The recorder 105 may be an external camera/video recorder that takes a image/video of the user interface 107. Alternatively, the recorder 105 may be able to take a graphical image/video stream (not actually displayed) and automatically create the localized graphical image 106 as described herein.

The localized graphical image 106 is generated from an output of the recorder 105 that has been localized based on the processes described herein. The localized graphical image 106 may be a localized version of individual screen shot(s), may be a full video recording of a user using the browser 102, and/or the like.

The user interface 107 can be or may include any hardware coupled with software that can display graphical images, such as, a Light Emitting Diode (LED) display, a Cathode Ray Tube (CRT), a plasma display, a touch screen, a video monitor, a television, and/or the like. The user interface 107 may include other elements, such as, a mouse, a microphone, a keyboard, a keypad, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any hardware coupled with software that can be used to test an application 121. The server 120 further comprises the application 121, a localization module 122, and the localization files 104.

The application 121 can be or may include any application 121 that can be tested via the communication device 101, such as, a web application, a client/server application, a storage application, a commercial application, transaction application, an online store, and/or the like. As described herein, the browser 102 can be used to exercise the application 121 via web pages that are displayed in the browser 102. However, the scope of what is described herein is not limited specifically to a web server environment. For example, the processes described herein may work where there is also a client application that is used to interface with the application 121.

The localization module 122 is used to provide localization services that may be used by the localization plugin 103. The localization module 122 may be used to change the information sent via web pages to provide localization services in a generated graphical image (e.g., a video recording of a user testing the application 121).

The localization file(s) 104 on the server 120 may be the same as the localization files 104 on the communication device 101. Alternatively, the localization file(s) 104 on the server 120 may be different from the localization file(s) 104 on the communication device 101. For example, the localization file(s) 104 on the communication device 101 may only include Chinese localization files 104 of English text strings whereas the localization file(s) 104 on the server 120 may contain Chinese, French, German, and Spanish translations of English text strings.

Figure 2:
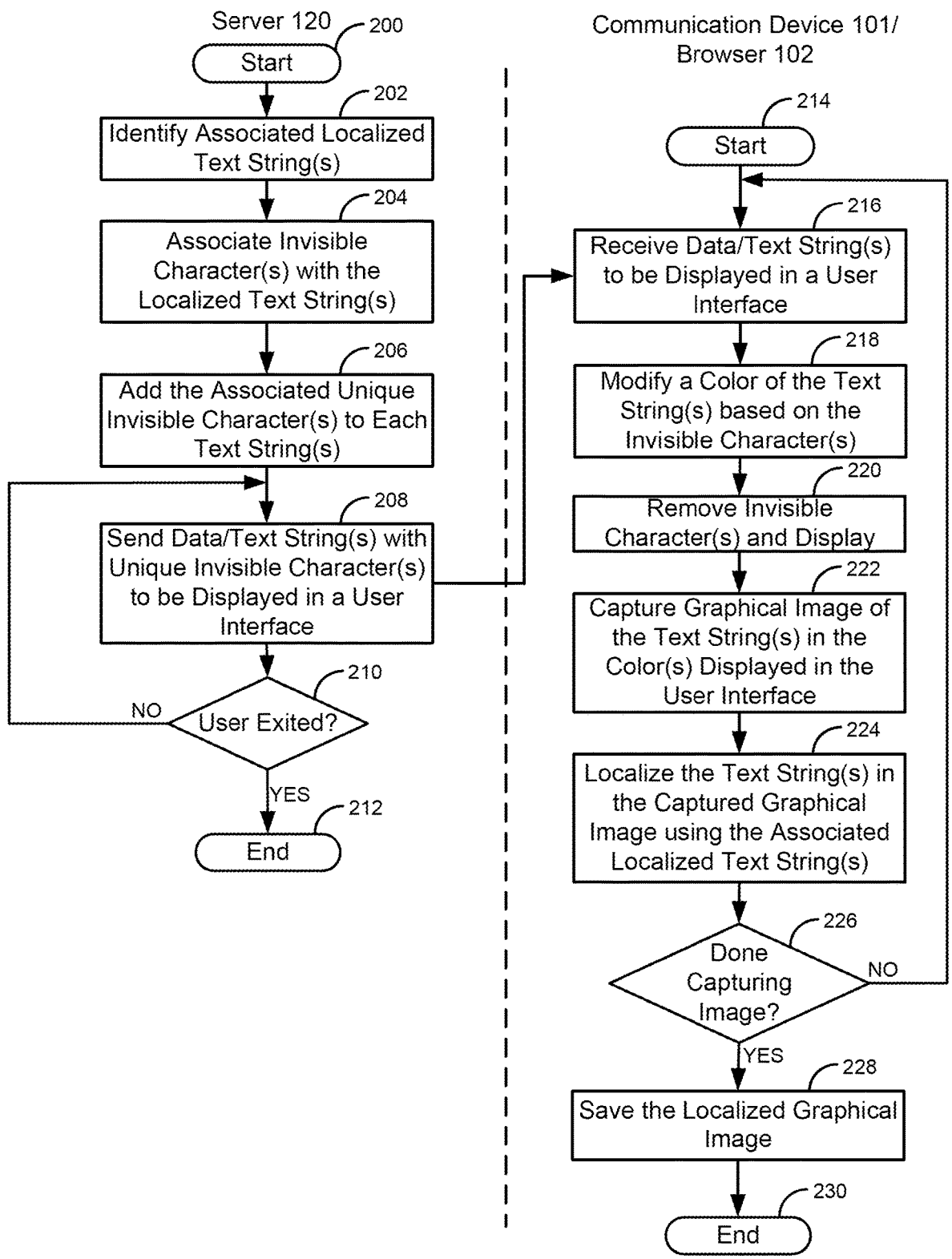
FIG. 2 is a flow diagram of a process for localizing a graphical image using colors and invisible characters.

FIG. 2 is a flow diagram of a process for localizing a graphical image using colors and invisible characters. Illustratively, the communication device 101, the browser 102, the localization plugin 103, the recorder 105, the user interface 107, the server 120, the application 121, and the localization module 122 are stored-program-controlled entities, such as a computer or microprocessor, which performs the methods of FIGS. 2-7 and the processes described herein by executing program instructions stored in a computer readable storage medium, such as a memory (i.e., a computer memory, a hard disk, and/or the like). Although the methods described in FIGS. 2-7 are shown in a specific order, one of skill in the art would recognize that the steps in FIGS. 2-7 may be implemented in different orders and/or be implemented in a multi-threaded environment. Moreover, various steps may be omitted or added based on implementation.

The process of FIG. 2 is described from the perspective of the server 120 and the communication device 101/browser 102. The process on the server 120 starts in step 200. The localization module 122 identifies associated localized text string(s) in step 202. For example, the identified localized text string(s) may be localized versions (e.g., Chinese, Spanish, etc.) of English text strings. The localization module 122 may identify the localization files 104 in various ways. For example, programming languages like Java support localization of files in a known format.

The localization module 122 associates invisible character(s) (e.g., Unicode characters 200B, 200C, etc.) with the text string/localized text in step 204. The invisible characters are unique to each text string within a context or may be globally unique for the application 121. A context may be for a specific web page, a specific view, a location in a view or web page, and/or the like. The invisible characters may be unique for the same text string because of context (a language context in this case). For example, the English word "Ok" has different Chinese translations based on the context it is being used in.

The localization module 122 adds the associated unique invisible character to the text string in step 206. The added invisible character is typically a single character; however in some embodiments, the added invisible character may include two or more invisible characters (e.g., if needed to be unique). The invisible character is typically placed at the beginning of each text string. However, the invisible character may be located anywhere within the text string. In addition, the invisible character may be added at the end of the text string. The text string with the added invisible character is then sent along with the data (e.g., web page data) for display in the browser 102 (e.g., in user interface 107) in step 208.

The localization module 122 determines if the user has exited in step 210. For example, if the user logs out or closes the browser 102, this would be an indication that the user has exited in step 210. If the user has exited in step 210, the process ends in step 212. Otherwise, if the user has not exited in step 210, the process goes back to step 208 and sends data/text string(s) with the invisible characters. For example, if the user browses to different web page of the application 121, the data/text string(s) with the invisible characters for the new web page are sent in step 208.

The process on the communication device 101/browser 102 starts in step 214. The browser 102 receives the data/text strings that are to be displayed in a user interface 107 in step 216. The browser plugin 103 intercepts the text strings to be displayed. Colors of each the text strings are modified based on the corresponding invisible character in the text string in step 218. The text strings may be modified using the unique colors in different ways. For example, the whole text string may be set to a unique color, an individual character (e.g., the first character) in the text string may be set to the unique color, a portion of the text string may be set to the unique color, and/or the like. The invisible character/color are essentially an index that points to the corresponding localized text string (e.g., that is stored in the localization file 104). The color may be associated with a specific localized string or a specific localized string in a specific language.

The browser plugin 103 may optionally remove, in step 220, the invisible character(s) from the text string(s) and then displays the colored text strings (without the invisible characters) in the user interface 107. The recorder 105 captures a graphical image (e.g., a video image) of the colorized text strings that are display by the browser 102 in the user interface 107 in step 222. The browser plugin 103 then localizes the text strings in the captured graphical image in step 224. As discussed above, the invisible characters are used as an index to identify the appropriate localized string. The browser plugin 103 may localize the text strings in various ways, such as, replacing the text string with the localized text string (e.g., in a specified language). The localization of step 224 may occur in real time. In one embodiment, the localization of the text strings is performed external to the browser plugin 103 via an application in the communication device 101. The process of step 224 is further described in FIG. 4.

The browser plugin 103 determines, in step 226, if the process is not done capturing a graphical image. If the process is done capturing the graphical image in step 226, the process goes back to step 216 to receive more data/text strings. Otherwise, if the process is done capturing the graphical image in step 226, the browser plugin 103 saves the localized graphical image 106 (e.g., a localized video) in step 228. Although shown in step 228, the saving of the localized graphical image 106 may occur any time after step 224. The process then ends in step 230.

Figure 3:
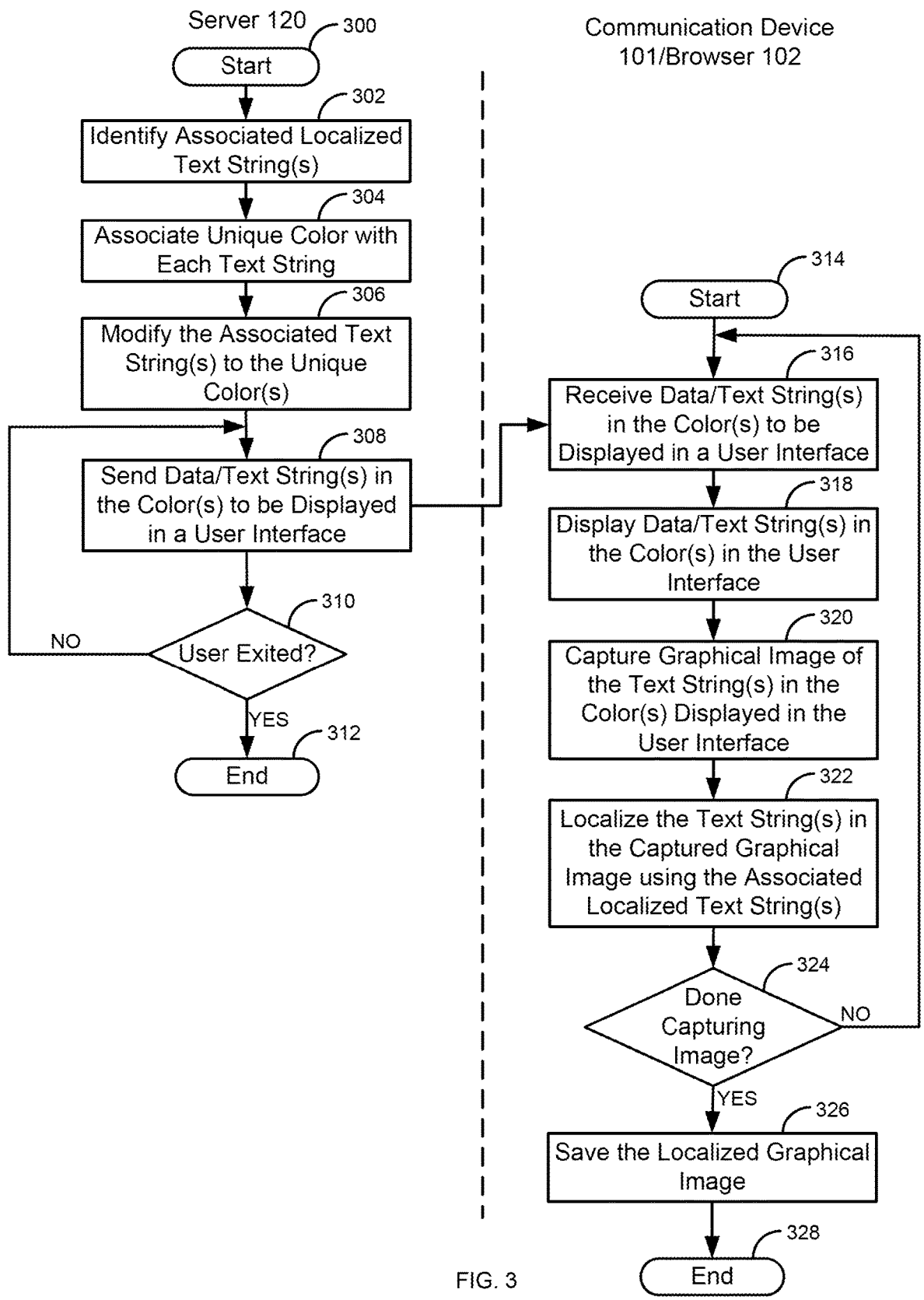
FIG. 3 is a flow diagram of a process for localizing a graphical image using colors.

FIG. 3 is a flow diagram of a process for localizing a graphical image using colors. The process of FIG. 3 is also described from the perspective of the server 120 and the communication device 101/browser 102. The process, on the server 120, starts in step 300. The localization module 122 identifies associated localized text string(s) in step 302. The localized text strings may be localized text strings in multiple languages. The localization module 122 associates a unique color with each of the text string(s) in step 304. For example, if there were two English text strings, there would be a respective unique color associated with each of the English text strings. The color may be associated with a specific localized string or a specific localized string in a specific language. The color of the text string(s) is modified using the unique colors in step 306. The modification may be some or all of the text string(s) (e.g., the first character in the text string, a portion of the text string, or the whole text string). The data (e.g., data of the web page) and the text string(s) in the colors (e.g., English text string(s)) are sent to be displayed in the user interface 107 of the communication device 101 (e.g., via the browser 102) in step 308.

The localization module 122 determines, in step 310, if the user has exited. The user exiting in step 310 may be determined based on the user closing the browser 102 or web page. If the user has not exited in step 310, the process goes back to step 308 to send additional data/colorized text string(s). For example, when the user navigates to a different web page, scrolls a web page, scrolls a text area, and/or the like. Otherwise, if the use has exited, the process ends in step 312.

The process of the browser 102 starts in step 314 (e.g., the starting of the browser 102). The browser 102 receives the data/text string(s) in the color(s) to be displayed in the user interface 107 in step 316. The browser 102 displays the data/text string(s) in the color(s) in step 318. The recorder 105 captures, in step 320, the image of the text string(s) in the color(s) that are displayed in the user interface 107. The browser plugin 103 localizes the text strings, by identifying the colors in the text string(s) in step 322. The browser plugin 103 may localize the text string(s) in a specific language based on a configured setting in the browser plugin 103. The browser plugin 103 may do the localization of step 322 in real-time and display the localized graphical image 106 to the user in real-time.

The browser plugin 103 determines, in step 324, if the user is done capturing the graphical image in step 324, If the user is not done capturing the graphical image in step 324, the process goes back to step 316. Otherwise, if the user is done capturing the graphical image in step 324, the browser plugin 103, in step 326, saves the localized graphical image 106. Although not shown, the saving of the graphical image may occur any time after step 322. The process then ends in step 328.

Figure 4:
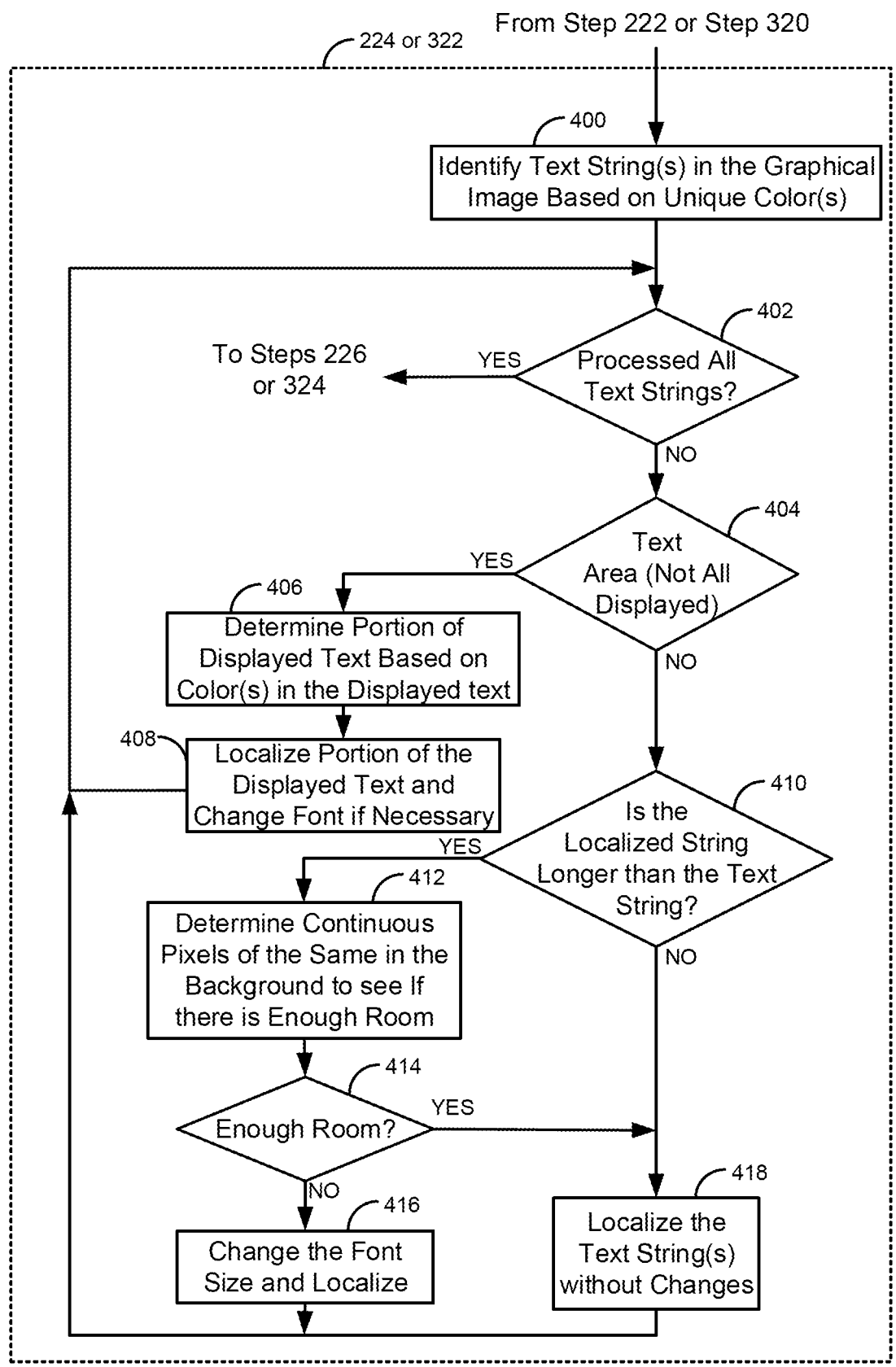
FIG. 4 is a flow diagram of a process for managing how localized text strings are displayed in a graphical image.

FIG. 4 is a flow diagram of a process for managing how localized text strings are displayed in a graphical image. The process of FIG. 4 is an exemplary embodiment of step 224 or step 322 of FIGS. 2 and 3. After capturing the displayed data/text string(s) in the user interface 107 in step 222/320, the browser plugin 103 identifies, in step 400, the text string(s) in the graphical user interface 107 based on the unique colors. The browser plugin 103, in step 402, determines if all the text string(s) have been processed. If all the captured text string(s) have been processed in step 402, the process goes to steps 226/324.

If all the text string(s) have not been processed in step 402, the browser plugin 103 determines, in step 404, if the current text string is part of a text area where all the text string is not displayed. For example, the user may have to use a scrollbar to scroll down to see all of the text string. If not all of the text string is displayed in the text area in step 404, the browser plugin 103 determines what is displayed based on multiple text letters having different colors in step 406. For example, as shown and described later on in FIG. 6B, the text string may have a different unique color every 10 characters (or any defined number of characters). Alternatively, every X number of characters will have a unique color. In addition, instead of using the color (other than to identify the text string), the browser plugin 103 may determine the portion that is displayed based on comparing the actual text string with what is displayed. The browser plugin 103 localizes the displayed portion of the displayed text string and changes the font if necessary in step 408. The font may need to be changed if the size of the portion of the localized text string is longer than the non-localized text string so that the localized portion is displayed properly. The process then goes back to step 402.

If the text string is in a text area that is not fully displayed in step 404, the browser plugin 103, in step 410, determines if the localized text string is longer than the text string. If the localized text string is longer than the text string in step 410, the browser plugin 103 determines if there are continuous pixels of the same color in the background to allow for the extra length in step 414. If there is not enough room in step 414, the browser plugin 103 changes the size of the font as necessary and localizes the text to display the full localized text string in step 416. The process then goes back to step 402.

If the localized text string is not longer than the localized text string in step 410 or there is enough room in step 414, the browser plugin 103 localizes and displays the text string without changes in step 418. The process then goes back to step 402.

Figure 5:
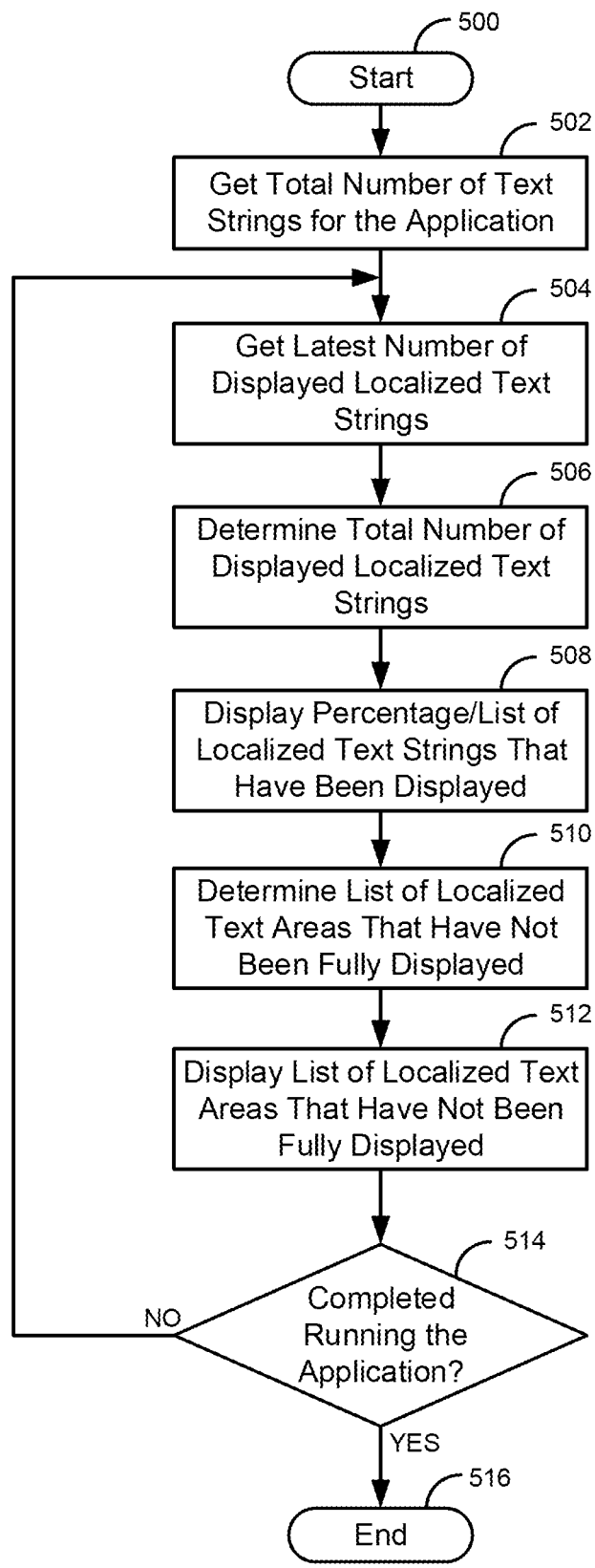
FIG. 5 is a flow diagram of a process for displaying information related to a number of localized text strings that have been displayed.

FIG. 5 is a flow diagram of a process for displaying information related to a number of localized text strings that have been displayed. The process starts in step 500. The browser plugin 103 gets the total number of text string for the application 121 in step 502. The browser plugin 103 gets the latest number of displayed localized text strings in step 504. The latest number of localized text strings may be the number of localized text strings that are displayed/captured when a new web page is displayed. The browser plugin 103 determines the total number of displayed localized text strings in step 506. The process may also identify a location (e.g., web page URL/location on the web page) of the text string that has not been fully displayed.

The browser plugin 103 displays a percentage and/or list of the localized test strings that have been displayed in step 508. The browser plugin 103 determines the list of localized text areas that have not been fully displayed in step 510. The browser plugin 103 displays the list of text areas that have not been fully displayed in step 512. The process may also identify a location (e.g., web page URL/location on the web page) of the text area that has not been fully displayed.

The browser plugin 103 determines, in step 514, if the user has completed running the application 121. If the user is not done in step 514, the process goes back to step 504. Otherwise, if the user is done running the application 121 in step 514, the process ends in step 516. Although not shown, the process of FIG. 5 may also store the results for later testing.

Figure 6A:
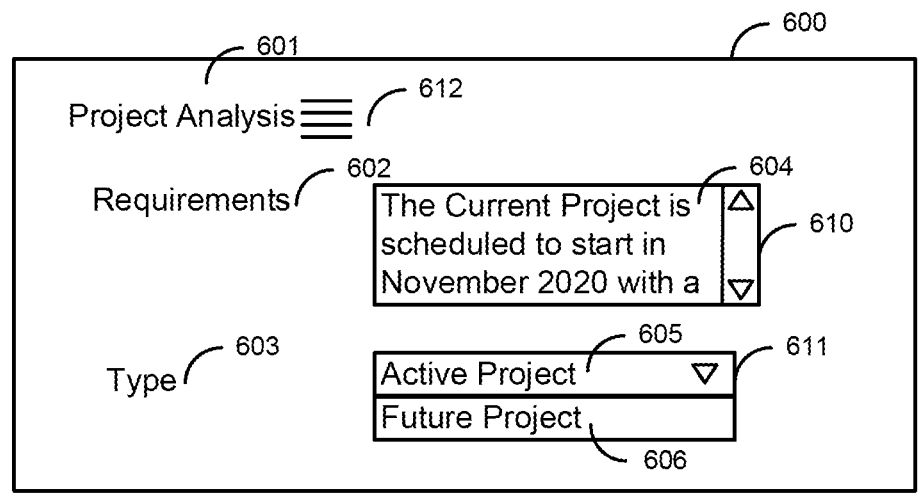
FIG. 6A is an exemplary diagram of a normal view of a graphical image.

FIG. 6A is an exemplary diagram of a normal view of a graphical image 600. The graphical image 600 comprises text strings 601-603, text area 610, menu 611, and icon 612. The text area 610 comprises text string 604. The menu 611 has two menu items that comprise text strings 605-606.

The text string 601 comprises the text "Project Analysis." The text string 602 comprises the text "Requirements." The text string 603 comprises the text "Type." The text string 604 shows the text "The Current Project is scheduled to start in November 2020 with a." However, the text string 604 further comprises additional text that is not displayed in the graphical image 600. In order for a user to see the full text string 604, the user will need to use the scrollbar in the text area 610. The text string 605 comprises the text "Active Project." The text string 606 comprises the text "Future Project." The graphical image 600 is how the graphical image 600 would be displayed before localization is done using the processes described herein.

Figure 6B:
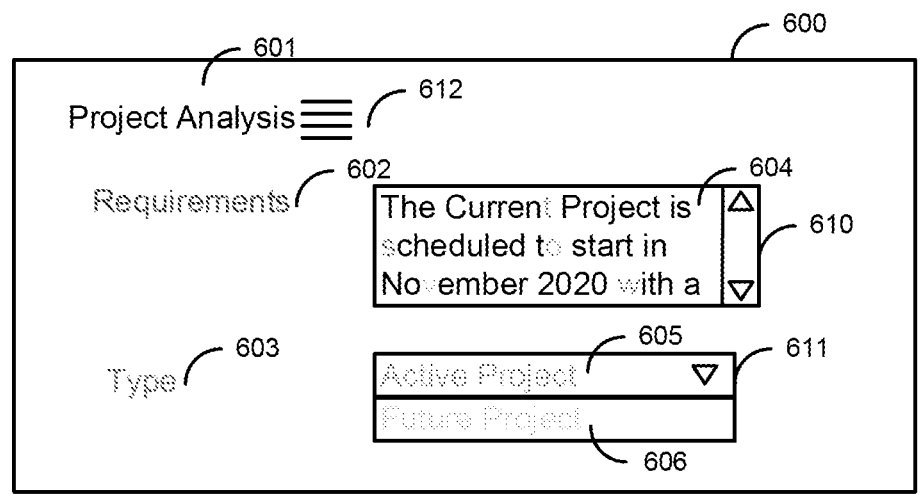
FIG. 6B is an exemplary diagram of a graphical image where colors are used to dynamically localize text strings.

FIG. 6B is an exemplary diagram of the graphical image 600 where colors are used to dynamically localize text strings. Although not shown in color, FIG. 6B represents the colorized strings using grey scale (which may actually be a shade of grey). The text strings 601-603 and 605-606 are displayed where each of the text strings are displayed using a unique color. As shown in FIG. 6B, all the characters in the individual text strings 601-603 and 605-606 each have the same respective color. However, in another embodiment, a single character (or a number of characters) may be in the unique color.

The text string 604 is in the text area 610 and has every tenth character being in a unique color. Having every tenth character in a unique color helps to determine where a portion of the text string 604 is not shown. As one of skill in the art would recognize, the number ten is not unique. For example, the process may have each character being a unique color in the text string 604 or every other character. Alternatively, where ten characters are used (or the other embodiments), each group of ten characters may be in the same unique color.

The graphical user image 600 of FIG. 6B is what is an exemplary embodiment shown to the user in steps 220 and 318 and is captured by the recorder 105. Although FIGS. 6A-6B are shown as a single graphical image 600, the graphical image may be a full video of a user as the user navigates the application 121.

Figure 7:
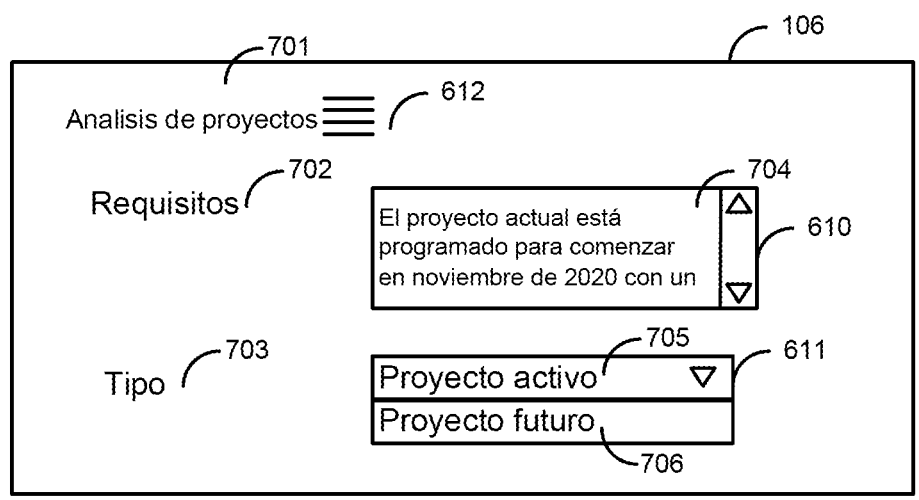
FIG. 7 is an exemplary diagram of a localized graphical image.

FIG. 7 is an exemplary diagram of a localized graphical image 106. FIG. 7 is an exemplary embodiment where the graphical image 600 in FIG. 6B has been localized from English to Spanish. FIG. 7 comprises Spanish localized text strings 701-706 (localized versions of the English text strings 601-606). FIG. 7 also comprises text area 610, menu 611, and icon 612. FIG. 7 is what is generated when the graphical image 600 of FIG. 6B is localized in steps 224/322 and stored in steps 228/326.

In FIG. 7, the localized text string 701 is in a smaller font than the text string 601. In this example, the font size was changed (step 416) so that it does overlap on top of the icon 612 because the localized text string 701 is too long. Likewise, the text string 704 in the text area 610 is in a smaller font size because the localized portion of the text string 704 is longer that the same portion of the text string 604. The localized text strings 702, 703, 705, and 706 have the same font as text strings 602, 603, 605, and 606 because there was enough room in step 414.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously, automatically, and in real-time.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
identify a text string that has an associated localized text string;
associate at least one unique color with one or more characters of the identified text string;
modify the one or more characters of the identified text string with the associated at least one unique color;
generate for display, in a user interface, the identified text string with the associated at least one unique color;
capture a graphical image of the identified text string with the associated at least one unique color; and
localize the identified text string based on the associated at least one unique color in the captured graphical image of the identified text string using the associated localized text string,
wherein the identified text string is a word having a plurality of characters and
wherein only a portion of the identified text string is modified.

2. The system of claim 1, wherein modifying the one or more characters of the identified text string with the associated at least one unique color is based on an invisible character that is inserted into the identified text string.

3. The system of claim 2, wherein the invisible character is used to identify a specific one of a plurality of associated localized text strings.

4. The system of claim 3, wherein the invisible character is used as an index to localize the identified text string from the plurality of associated localized text strings based on a context.

5. The system of claim 1, wherein the microprocessor readable and executable instructions, when executed by the microprocessor further cause the microprocessor to:
determine that the associated localized text string is a larger size than the identified text string; and in response to determining that the associated localized text string is a larger size than the identified text string, perform at least one of:
  change a font size of the associated localized text string; and
  determine if a space around the graphical image of the captured text string with the associated at least one unique color has enough room.

6. The system of claim 1, wherein the captured graphical image of the identified text string is displayed in a text area and wherein the microprocessor readable and executable instructions, when executed by the microprocessor further cause the microprocessor to:
  modify the one or more characters of the identified text string with a plurality of associated unique colors; and
  localize the captured graphical image of the identified text string using the associated localized text string based on a number of the plurality of associated unique colors that are displayed in the text area of the captured graphical image of the identified text string.

7. The system of claim 6, wherein the plurality of associated unique colors are spaced within the identified text string based on a defined number of characters within the identified text string.

8. The system of claim 6, wherein capture the graphical image of the identified text string is based on the number of the plurality of associated unique colors that are displayed in the text area.

9. The system of claim 1, further comprising providing a plurality of text strings that each have a respective associated at least one unique color and wherein the microprocessor readable and executable instructions, when executed by the microprocessor further cause the microprocessor to perform at least one of:
  generate, for display, a percentage of un-displayed localized text strings;
  generate, for display, a list of the un-displayed localized text strings; and
  generate, for display, a list of localized text areas that have not been fully displayed.

10. A method, comprising:
  identifying a text string that has an associated localized text string;
  associating at least one unique color with one or more characters of the identified text string;
  modifying the one or more characters of the identified text string with the associated at least one unique color;
  generating for display, in a user interface, the identified text string with the associated at least one unique color;
  capturing a graphical image of the identified text string with the associated at least one unique color; and
  localizing the identified text string based on the associated at least one unique color in the captured graphical image of the identified text string using the associated localized text string,
  wherein the identified text string is a word having a plurality of characters and
  wherein only a portion of the identified text string is modified.

11. The method of claim 10, wherein modifying the one of more characters of the identified text string with the associated at least one unique color is based on an invisible character that is inserted into the identified text string.

12. The method of claim 11, wherein the invisible character is used to identify a specific one of a plurality of associated localized text strings.

13. The method of claim 12, wherein the invisible character is used as an index to localize the identified text string from the plurality of associated localized text strings based on a context.

14. The method of claim 10, further comprising:
  determining that the associated localized text string is a larger size than the identified text string; and
  in response to determining that the associated localized text string is a larger size than the identified text string, performing at least one of:
    changing a font size of the associated localized text string; and
    determining if a space around the captured graphical image of the identified text string with the associated at least one unique color has enough room.

15. The method of claim 10, wherein the identified text string is displayed in a text area and further comprising:
  modifying the one or more characters of the identified text string with a plurality of associated unique colors; and
  localizing the identified text string in the captured graphical image of the identified text string using the associated localized text string based on a number of the plurality of associated unique colors that are displayed in the text area of the captured graphical image of the identified text string.

16. The method of claim 15, wherein the plurality of associated unique colors are spaced within the identified text string based on a defined number of characters within the identified text string.

17. The method of claim 15, wherein capturing the graphical image of the identified text string is based on the number of the plurality of associated unique colors that are displayed in the text area.

18. The method of claim 10, further comprising a plurality of text strings that each have a respective associated at least one unique color and further comprising at least one of:
  generating for display a percentage of un-displayed localized text strings;
  generating for display a list of the un-displayed localized text strings; and
  generating display a list of localized text areas that have not been fully displayed.

19. A non-transient computer readable medium having stored thereon instructions that cause a processor to execute a method, the method comprising instructions to:
  identify a text string that has an associated localized text string;
  associate a unique color with the identified text string;
  modify the identified text string with the associated unique color;
  generate for display, in a user interface, the identified text string with the associated unique color;
  capture a graphical image of the identified text string with the associated unique color; and
  localize the identified text string based on the associated unique color in the captured graphical image of the identified text string using the associated localized text string,
  wherein the identified text string is a word having a plurality of characters and
  wherein only a portion of the identified text string is modified.

20. The non-transient computer readable medium of claim 19, wherein modifying the identified text string with the associated unique color is based on an invisible character that is inserted into the identified text string.

* * * * *